United States Patent [19]

Ong

[11] 4,279,615

[45] Jul. 21, 1981

[54] PROCESS AND AGENT FOR THE COLORING OF TEXTILES OF POLYESTER FIBERS

[75] Inventor: Sienling Ong, Hofheim am Taunus, Fed. Rep. of Germany

[73] Assignee: Hoechst Aktiengesellschaft, Fed. Rep. of Germany

[21] Appl. No.: 134,445

[22] Filed: Mar. 27, 1980

[30] Foreign Application Priority Data

Mar. 29, 1979 [DE] Fed. Rep. of Germany ....... 2912497

[51] Int. Cl.$^3$ ................................................ D06P 3/52
[52] U.S. Cl. ......................................... 8/582; 8/609; 8/637; 8/650; 8/652; 8/922
[58] Field of Search ................... 8/582, 609, 637, 650, 8/922

[56] References Cited

U.S. PATENT DOCUMENTS

| 3,653,800 | 4/1972 | Blackwell | 8/532 |
| 3,656,880 | 4/1972 | Blackwell | 8/532 |
| 4,055,393 | 10/1977 | Schafer | 260/410.6 |
| 4,209,333 | 6/1980 | Ong et al. | 106/25 |

FOREIGN PATENT DOCUMENTS 861671  6/1978  Belgium .

*Primary Examiner*—A. Lionel Clingman
*Attorney, Agent, or Firm*—Connolly and Hutz

[57] ABSTRACT

Polyester fiber materials are colored by contacting them with aqueous compositions containing an organic pigment or a vat dyestuff or both and an oxpropylate of a mono- to hexahydric alkanol of 2 to 6 carbon atoms (containing 20 to 60 propylene oxide units) and fixing in a manner which is common for polyester. The colorations are fast to migration, especially to bleeding into PVC-coatings.

17 Claims, No Drawings

PROCESS AND AGENT FOR THE COLORING OF TEXTILES OF POLYESTER FIBERS

For the coloring of textile materials of polyester fibers there are commonly used disperse dyestuffs. In this case the dyestuff is dissolved in the polyester, thus yielding dyeings with a favorable fastness to wetting. However, as said dyeing process involves a dissolving operation, the dyestuff may also be extracted from the fiber, if the dyed material is contacted with organic substances which have a dissolving power for the dyestuff. Such an extraction of the dyestuff may already occur in dry cleaning at elevated temperature, but above all in those cases where a polyester material dyed in this manner is coated with a plastic material. For example, if a polyester material colored with disperse dyes is coated with plasticized polyvinyl chloride, part of the dyestuff migrates into the coating substance. This is probably due to the solubility of the dyestuff in the plasticizer, for example dioctyl phthalate. In the case of a printed material, this effect is the more disturbing as the printing patterns may bleed into one another. This migration effect may also involve problems for other finishing operations, for example in the treatment of the material with organic antistatic agents or with adjuvants influencing the feel. Thus, the migration of the dyestuff into the organic medium in the wound-up finished material, for example during transport, may result in smudging marks which make the goods useless.

Hence, it has been the object of the invention to provide colorations on materials of polyester fibers which do not show the above-mentioned drawbacks.

There has now been found a process for the coloration of textiles of polyester fibers, which comprises contacting, preferably impregnating or printing, the materials with aqueous preparations which contain organic pigments and/or vat dyestuffs and adjuvants of the formula (I)

$$C_nH_{2n+2-m}[O(CH_2-CH(CH_3)O)_{x/m}-H]_m \quad (I)$$

in which
- n is an integer of from 2 to 6,
- m is an integer of from 1 to 6 and
- x is an integer of from 20 to 60, with the proviso that m is smaller than or equal to n, and fixing the colorants according to a method common for polyester materials, namely by heating.

Another subject of the invention is an agent for performing this process which contains organic pigments and/or vat dyestuffs as well as an adjuvant of the formula (I).

Preferred embodiments of the invention are described in detail in the following.

The application of the hydrophobic colorant and the hydrophobic adjuvant of the formula (I) from aqueous media onto the goods is facilitated, if the aqueous preparations contain another adjuvant of the formula (II)

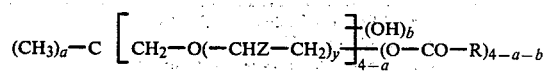

in which

R is an open-chain aliphatic radical of from 9 to 19 carbon atoms;
Z is hydrogen or methyl, the ratio of H:CH$_3$ being from 2:1 to 4:1;
a is zero or 1;
b is 1 to 1.5, and (4-a).y is from 150 to 300.

In this case, R—CO— stands preferably for the acyl radical of a fatty acid of from 11 to 17 carbon atoms in the radical R. The ratio of H:CH$_3$ in the radical Z is preferably 2.5:1 to 3.5:1 and (4-a).y is preferably from 200 to 250. More particularly, R—CO— is oleyl, the ratio of H:CH$_3$ in the radical Z is 3:1 in random distribution, a is 0, b is about 1.1, and (4-a).y is about 210. Adjuvants of this kind have been described in U.S. Pat. No. 4,209,333 which is incorporated by reference. These compounds act as thickeners and simultaneously as emulsifying agents, thus facilitating the incorporation of the hydrophobic substances into the aqueous printing pastes or padding liquors.

Of the compounds of the formula (I), preference is given to those which are derived from monohydric alcohols, i.e. in which m stands for 1, n is preferably 4 and x is 35 to 40.

Suitable organic pigments and vat dyestuffs are all compounds which have been specified in the Colour Index under the terms of "Pigment" and "Vat Dyestuff."

The pigments to be considered are compounds of the class of the azo, anthraquinone, nitro, methine, styrene, azostyrene, benzthiazole, nitroacridone, cumarine, naphthoperinone, quinophthalone, pyrazolone, quinizarine, nitrodiphenylamine, quinoline and naphthoquinone-imine series.

As vat dyestuffs there may be mentioned indigoid and anthraquinoid dyestuffs as well as sulfur dyestuffs and the derivatives of the vat dyestuffs, such as leuco vat dyestuff esters. Examples for anthraquinoid dyestuffs are compounds of the acylaminoanthraquinone, anthramide, pyranthrone, anthanthrone and perylene series.

The above-specified colorants may be employed in the commercial formulation, but also as press cakes, as they are obtained in the synthesis.

The amount used of the colorants depends on the intended color depth and is in the range of from 5 to 150 g, preferably from 20 to 100 g, per kg of printing paste or liter of padding liquor.

The compounds of the formula (I) are suitably used in an amount of from 30 to 250 g, preferably from 50 to 150 g, per kg of printing paste or per liter of padding liquor. The compounds of formula (II) are advantageously applied in an amount of from 0.1 to 100 g, especially from 2 to 30 g per kilogram or liter of the aqueous composition.

As has been mentioned before, the adjuvants of formula (II) act as thickeners and emulsifying agents. It is therefore not required generally to add further thickeners or other surfactants to the compositions. It is possible, however, to use other commercial surfactants or thickeners, for example alginates, carboxymethyl cellulose, starch ethers, polyacrylic acid salts and polyacrylamides in an amount that is common in practice. The thickeners are suitably added to the padding liquors or printing pastes in the form of an aqueous stock thickener.

The prints or pad dyeings are fixed in accordance with the methods which are common for polyester materials, i.e. by heating with steam, hot air, IR irradiation or contact heat. The materials are suitably treated with hot air at a temperature of from 170° to 210° C. for 30 to 120 seconds or with superheated steam at a temperature of from 170° to 200° C. for 3 to 15 minutes. The fixed prints or dyeings are finished in common manner.

According to the process of the invention there are obtained colorations on polyester goods in bright shades and with very good fastness properties, which are also fast to dry cleaning and towards finishing with synthetic resins, antistatic agents or coatings.

The following Examples illustrate the invention, the percentages being by weight. The Colour Index numbers have been taken from the third edition.

The adjuvant of formula (II) used in the Examples is that of Example 1 of U.S. Pat. No. 4,209,333 (Ser. No. 917,497) which was prepared as follows:

Pentaerythritol is oxalkylated with a mixture of ethylene oxide and propylene oxide in the molar ratio of 3:1 up to a molar weight of 10 000. 1 Mol of this oxalkylate is then esterified with 2.9 mols of oleic acid at a temperature in the range of from 160° to 165° C. for 15 hours under a nitrogen atmosphere.

It is referred to as "adjuvant (II)".

EXAMPLE 1

A fabric of polyethylene glycol-terephthalic acid ester fibers is padded with a padding liquor of the following composition:

```
   80 g  of Pigment Violet 23 (C.I. No. 51 319),
   15 g  of adjuvant (II),
  120 g  of a reaction product of 1 mol of n-butanol
          with 35 mols of 1,2-propylene oxide,
   50 g  of a 10% aqueous solution of a short-chain
          sodium alginate and
  735 ml of water
1,000 ml of padding liquor.
```

After the padding the material is dried and subjected to a treatment with hot air at 200° C. for 60 seconds, in order to fix the dyestuff.

Thereafter the material is rinsed, subjected to a reductive treatment in an aqueous alkaline sodium dithionite solution at 60° C., rinsed again and dried. There is obtained a bright violet dyeing of very good fastness properties.

Even if the material is coated with polyvinyl chloride, there is no migration of the dyestuff into the coating.

In order to test the fastness of the dyeing to the plasticizer contained in the coating mass, the following process is carried out:

100 cm² of the dyed polyester fabric are placed into 60 g of dioctyl phthalate at 80° C. and allowed to dwell therein for 15 hours at this temperature.

This dioctyl phthalate extract is then processed into a paste of the following composition:

5 g of the dioctyl phthalate extract,
5 g of commercial unplasticized polyvinyl chloride and
0.1 g of titanium dioxide are homogenized thoroughly in a dish with a pestle to give a paste; this substance is then allowed to swell at room temperature for about 20 minutes.

Said paste is then poured onto a glass plate having a side length of 10×10 cm, whereupon it is allowed to gelatinize for 10 minutes in a drying cabinet previously heated to 160° C.

For reasons of comparison a sample is prepared under the same conditions with pure dioctyl phthalate.

In this test with the dyeing prepared in accordance with the invention the two pieces of plastic material show an equally white shade. No dyestuff has migrated from the dyeing into the plasticizer.

EXAMPLE 2

A polyester fabric of polyethylene glycolterephthalate material is printed with a printing paste of the following composition:

80 g of the vat dyestuff of the formula

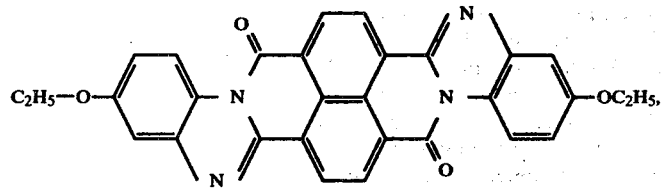

```
  15 g  of adjuvant (II),
 135 g  of the reaction product of n-butanol and
         propylene oxide of Example 1,
 300 g  of a 10% aqueous solution of a short-chain
         sodium alginate, and
 470 g  of water
1000 g  of printing paste.
```

After printing, the material is dried and fixed for 8 minutes in a high temperature steamer at 180° C.

Thereafter the goods are rinsed, subjected for 15 minutes at 50° C. to a reductive aftertreatment with a liquor containing per liter of water 1 ml of an aqueous 32.5% sodium hydroxide solution,
0.5 g of a wetting agent and
2 g of sodium dithionite.

Thereafter the goods are rinsed again and dried.

There are obtained brown prints of very good fastness properties in general and particularly a very good fastness to bleeding into synthetic coatings.

EXAMPLE 3

A fabric of polyethylene glycol-terephthalic acid ester material is printed with a printing paste of the following composition:

```
 80 g  of Pigment Yellow 83 (C.I. No. 21 108),
 15 g  of adjuvant (II),
150 g  of a reaction product of 1 mol of t-butanol
        with 40 mols of 1,2-propylene oxide,
300 g  of a 10% aqueous solution of a short-chain
        sodium alginate and
```

```
  455 g  of water
1,000 g  of printing paste.
```

The printed material is dried, fixed for 8 minutes in saturated steam at 180° C., rinsed, subjected to a reductive aftertreatment, rinsed again and dried.

There are obtained bright yellow prints of high fastness, which show the same color intensity even after 50 dry cleaning cycles with perchloroethylene or tetrachloroethane.

What is claimed is:

1. A process for the coloration of polyester fiber materials which comprises contacting said materials with an aqueous composition containing an organic pigment and/or a vat dyestuff and a compound of the formula (I)

$$C_nH_{2n+2-m}[O(CH_2-CH(CH_3)O)_{x/m}]_m \qquad (I),$$

wherein
- n is an integer of 2 to 6,
- m is an integer of 1 to 6,
- x is a number of 20 to 60, with the proviso that m is at most n, and fixing the dye by heating.

2. A process as claimed in claim 1, wherein the composition contains additionally a compound of the formula (II)

$$(CH_3)_a-C\left[CH_2-O(-CHZ-CH_2)_y\genfrac{}{}{0pt}{}{-(OH)_b}{-(OCO-R)_{4-a-b}}\right]_{4-a}, \qquad (II)$$

wherein
- R is an open-chain aliphatic radical having from 9 to 19 carbon atoms,
- Z stands for hydrogen or methyl, the ratio of H:CH$_3$ being from 2:1 to 4:1,
- a is zero or 1,
- b is 1 to 1.5 and (4-a).y is 150 to 300.

3. A process as claimed in claim 1, wherein said contacting is performed by impregnating or printing.

4. A process as claimed in claim 1, wherein the pigment is an azo, anthraquinone, nitro, methine, styrene, azostyrene, benzthiazole, nitroacridone, cumarine, naphthoperinone, quinophthalone, pyrazolone, quinizarine, nitrodiphenylamine, quinoline or naphthoquinone-imine pigment.

5. A process as claimed in claim 1, wherein the vat dyestuff is of the indigo, anthraquinone or sulfur dyestuff series.

6. A process as claimed in claim 1, wherein the aqueous composition contains 5 to 150 g of dyestuff or pigment per kilogram or liter.

7. A process as claimed in claim 6, wherein the amount is 20 to 100 g.

8. A process as claimed in claim 1, wherein the aqueous composition contains 30 to 250 g of the compound of formula (I) per kilogram or liter.

9. A process as claimed in claim 8, wherein the amount is 50 to 150 g.

10. A process as claimed in claim 1, wherein in formula (I) n is 4, m is 1 and x is 35 to 40.

11. A process as claimed in claim 1, wherein in formula (II) R—CO— is the acyl radical of a fatty acid having 11 to 17 carbon atoms in the radical R; the ratio of H:CH$_3$ in Z is from 2.5:1 to 3.5:1, and (4-a).y is 200 to 250.

12. A process as claimed in claim 1, wherein in formula (II) R—CO— is oleyl, the ratio of H:CH$_3$ in Z is 3:1 in random distribution, a is zero, (4-a).y is about 210 and b is 1.1.

13. A process as claimed in claim 1, wherein fixation is performed with steam, hot air, IR-irradiation or contact heat.

14. A process as claimed in claim 1, wherein fixation is performed with hot air at a temperature of 170° to 210° C. or with superheated steam at a temperature of 170° to 200° C.

15. A dyeing composition for performing a process as claimed in claim 1, comprising an organic pigment and/or vat dyestuff, a compound of formula (I) and a compound of formula (II).

16. A composition as claimed in claim 15, consisting essentially of water and, referred to 1 kg or 1 l of composition,
- 5 to 150 g of pigment and/or vat dyestuff,
- 30 to 250 g of a compound of formula (I) and
- 0.1 to 100 g of a compound of formula (II).

17. A composition as claimed in claim 15, consisting essentially of water and, referred to 1 kg or 1 l of composition,
- 20 to 100 g of pigment and/or vat dyestuff,
- 50 to 150 g of a compound of formula (I) and
- 2 to 30 g of a compound of formula (II).

* * * * *